Oct. 17, 1961  L. E. STARK  3,004,872
POLYETHYLENE BINDER FOR FLUX-COATED WELDING ROD
Filed Dec. 7, 1955
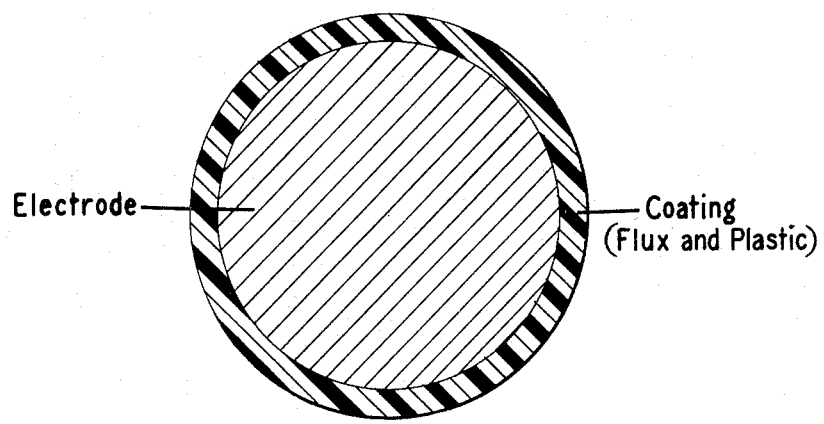
INVENTOR.
LOUIS E. STARK
BY *John F. Hohmann*
ATTORNEY

United States Patent Office 3,004,872
Patented Oct. 17, 1961

3,004,872
POLYETHYLENE BINDER FOR FLUX-COATED WELDING ROD
Louis E. Stark, Grand Island, N.Y., assignor to Union Carbide Corporation, a corporation of New York
Filed Dec. 7, 1955, Ser. No. 551,513
3 Claims. (Cl. 117—202)

This invention relates to flux-coated rods, and more particularly concerns an improved binder for retaining the flux coating on the rod.

In conventional flux-coated rods for brazing and welding, the usual practice is to incorporate in the flux a small amount of binder material to prevent loss of the fluxing material, and to impart gripping action to the flux, so that it will not rupture or flake from the rod. Heretofore, methyl methacrylate has been used because of its satisfactory binding properties. Although mechanically successful, methyl methacrylate has not been entirely effective because of its tendency to permit passage of moisture from the surrounding air with consequent hydration and swelling of the flux components. This hygroscopic action gradually causes rupturing of the flux bond, and flaking of the flux from the rod. In addition, the odor of the burning methyl methacrylate during the welding operation is disagreeable, and particularly undesirable in enclosed spaces.

It is, therefore, an important object of the present invention to provide in a flux coating composition for a welding or brazing rod, an improved binder material, which will substantially obviate the outstanding objections heretofore encountered.

Another object of the present invention is to provide an improved flux coating composition including a binder material having good adhesive characteristics, and being well suited for use where humidity changes are encountered and burning with non-objectionable odor is desired.

Yet another object of the present invention is to provide an improved binder material for a flux coating composition which is substantially non-hygroscopic, and which will substantially strengthen the adhesive properties of such coating composition over prolonged storage periods.

The above objects are achieved in the present invention by incorporating in a flux coating composition a binder material exhibiting non-hygroscopic properties, inoffensive burning characteristics, and capable of contributing to the formation of longer lasting flux coatings at least to a greater degree than the binder materials presently employed in conventional flux coating compositions. For this purpose the binder material of the invention comprises a normally solid polyethylene resin having a melt index of from about 0.1 to 500, and a density of from about 0.89 to 0.96 gram per cubic centimeter. The polyethylene resin suitable for use in the practice of the invention may be prepared by any of the procedures known in the art, i.e., at atmospheric pressure, at normal room temperature, or at elevated temperatures and pressures in accordance with the method described in the Patent No. 2,153,553 to E. W. Fawcett et al. issued April 11, 1939. Highly satisfactory results may be obtained when the polyethylene binder is present in the flux coating in an amount between 10 percent and 45 percent by weight, and preferably between 15 percent and 30 percent.

In applying a flux coating composition embodying the principles of the invention onto a solid core of welding metal, a mixture of the flux ingredients including the polyethylene binder is first heated at a temperature above 200° F., but below the melting point of the flux until it becomes sufficiently viscous to coat each of the flux particles, and to adhere to the welding metal. Thereafter the coating may be applied preferably by extruding the coating material over the rod.

The drawing illustrates a coated electrode having a flux and plastic binder produced according to the teachings of the present invention.

In testing rods having a flux coating composition embodying the invention, composite rods were made, using as a binder polyethylene of different molecular weights, and varying the percentage of polyethylene binder in the flux coating composition. The flux coating was prepared by heating the polyethylene to a temperature of approximately 250° F., at which temperature it became a viscous liquid. The dry flux material designated as Oxweld Brazing Flux, manufactured by the Linde Mfg. Co., was also heated to approximately 250° F., and then mixed with the pre-heated polyethylene binder in various ratios, a typical composition being 75% by weight of flux to 25% by weight of binder, to form a viscous slurry of smooth consistency, the temperature being maintained at approximately 250° F. throughout the mixing procedure. Thereafter the fluxing material was extruded onto the rod core, which had also been heated to approximately 250° F.

Specific tests of the moisture resistance of coated brazing rods containing anhydrous sodium tetraborate, boric acid and an organic binder, and made in accordance with the above described procedure were conducted under controlled conditions. In these tests both standard methacrylate-bonded, flux-coated brazing rods and flux-coated rods having the improved polyethylene binder material of the present invention were exposed to atmospheric conditions of varying humidity for eight months. During this period, the humidity levels varied between about 25% and 100% relative humidity. It was found that the surfaces of standard flux-coated rods became rough and puffed after being exposed for about one month to the above conditions. At the end of the eight months test period, the standard rods were badly puffed and portions of the coating had flaked from the core rod. Under similar conditions, in contrast to the standard rods, rods coated with the polyethylene bonded flux material of the present invention exhibited remarkable moisture resistance, the flux coating remaining smooth and unaffected throughout the entire testing period.

In another test, both the standard rods and rods coated with the polyethylene-bonded flux of the present invention were allowed to stand in water for two hours. At the end of that time, the standard flux had absorbed considerable moisture, and was very easily rubbed off. The coating of the invention resisted the effects of this immersion.

Welding or brazing rods provided with flux coatings having the polyethylene binder of the invention produce strong ductile welds. During use, no noxious or offensive fumes are produced, and the welds are sound and clean.

It will be understood that modifications and variations may be effected without departing from the scope of the novel concepts of the present invention.

What is claimed is:

1. A flux coated welding rod for brazing or welding having as a bonding agent in the coating, a polyethylene binder material for imparting moisture resistance to said coating, and exhibiting non-offensive odors during burning, said binder material being present in an amount not substantially less than 10% and not substantially more than 45%.

2. A flux coated welding rod according to claim 1, said polyethylene binder material having a melt index of from about 0.1 to 500, and a density of from about 0.89 to 0.96 gram per cubic centimeter.

3. A flux coated welding rod for brazing and welding having as a bonding agent in the coating, a polyethylene binder material for imparting moisture resistance to said coating, and exhibiting non-offensive odors during burning, said binder material being present in an amount not substantially less than 15% and not substantially more than 30%.

References Cited in the file of this patent

UNITED STATES PATENTS

| | | |
|---|---|---|
| 2,248,104 | Marini et al. | July 8, 1941 |
| 2,421,594 | Boot | June 3, 1947 |
| 2,452,493 | Rollason et al. | Oct. 26, 1948 |
| 2,466,038 | Midwinter et al. | Apr. 5, 1949 |
| 2,847,338 | Morrison | Aug. 12, 1958 |

OTHER REFERENCES

"Alathon," E. I. du Pont Bulletin (copyright 1950), pages 32–34.

Simonds et al.: Handbook of Plastics, D. Van Nostrand Co., 2nd Ed., pages 418–421.